(No Model.)
J. HOWES.
AIR FILTERING APPARATUS FOR TANKS, CISTERNS, &c.
No. 350,627. Patented Oct. 12, 1886.
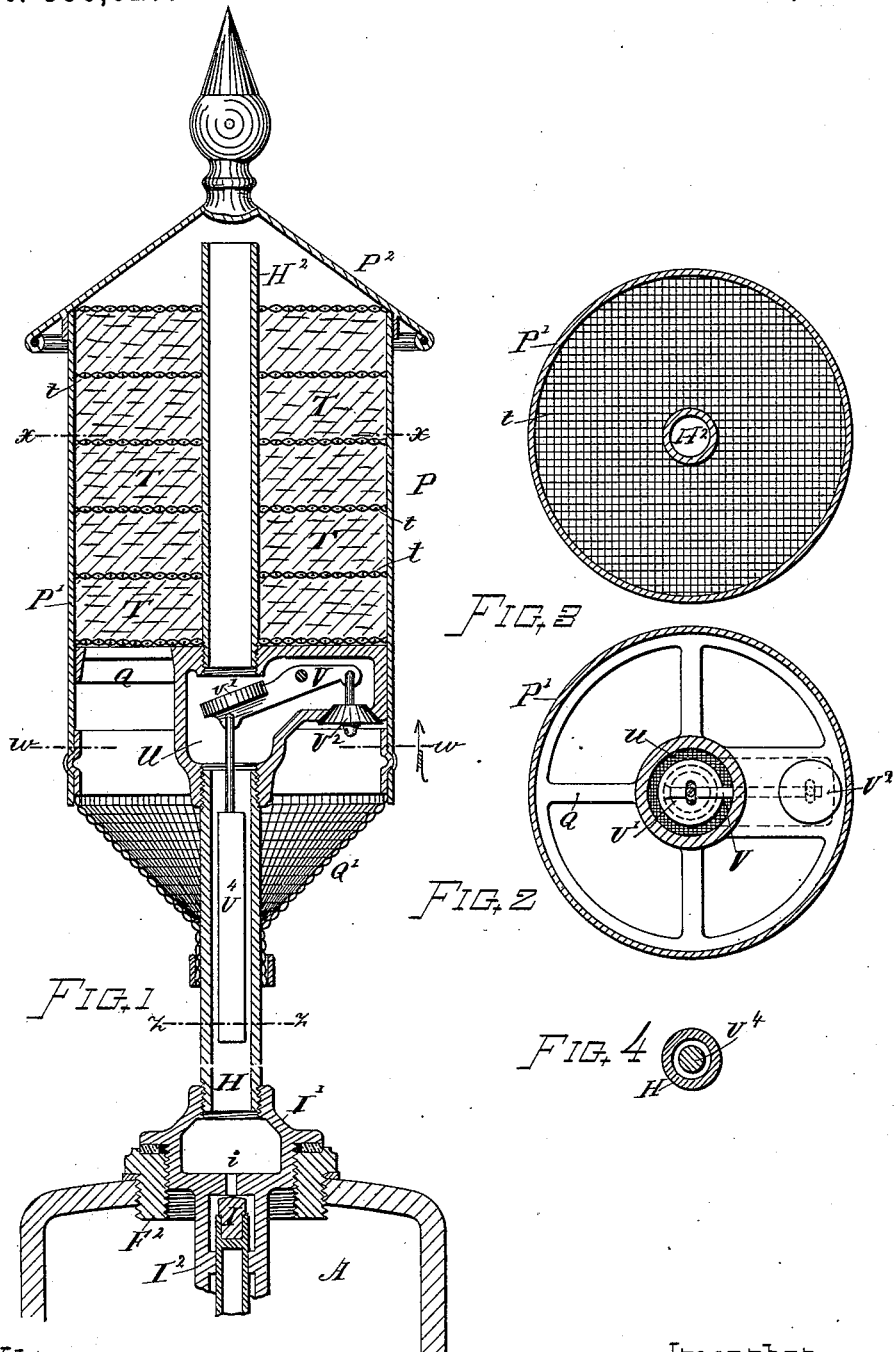

UNITED STATES PATENT OFFICE.

JOHN HOWES, OF WORCESTER, MASSACHUSETTS.

AIR-FILTERING APPARATUS FOR TANKS, CISTERNS, &c.

SPECIFICATION forming part of Letters Patent No. 350,627, dated October 12, 1886.

Application filed January 13, 1886. Serial No. 188,430. (No model.)

*To all whom it may concern:*

Be it known that I, JOHN HOWES, a citizen of the United States, residing at Worcester, in the county of Worcester and State of Massachusetts, have invented certain new and useful Improvements in Air-Filtering Apparatus for Tanks, Cisterns, and other Purposes, of which the following, together with the accompanying drawings, is a specification sufficiently full, clear, and exact to enable persons skilled in the art to which this invention appertains to make and use the same.

The object of my present invention is to provide an efficient and desirable air-filtering apparatus for use in connection with chambers, tanks, or cisterns for storing liquid and for other purposes, for purifying the air before it enters the chambers, and for preventing the introduction of dust and vermin thereto; also, to provide, in an air-filtering apparatus for the purpose set forth, means for automatically preventing reverse flow through the filter or inundation of the filtering material by rise of water in the pipe which connects the air-filter with the cistern, reservoir, or tank. These objects I attain by mechanism the nature, construction, and operation of which are explained in the following description, the particular subject-matter claimed being hereinafter definitely specified.

In the drawings, Figure 1 is a vertical sectional view of an air-filter constructed in accordance with my invention. Fig. 2 is a horizontal section at line $w$ $w$, Fig. 1, looking upward from beneath. Fig. 3 is a horizontal section at line $x$ $x$, Fig. 1; and Fig. 4 is a horizontal section at line $z$ $z$, Fig. 1.

In referring to parts, A denotes the chamber, tank, or reservoir, into which the filtered air is drawn by any convenient means. H indicates the pipe or conductor through which it passes from the filter P to said chamber, and I indicates a stop-valve for closing the inlet-passage $i$ to the chamber A. Said valve may be automatically operated when desired—as, for instance, in the case of a storage-tank—by means of a float rising and falling with the level of the liquid contained therein.

The pipe H can extend from a tank or chamber to a position above the roof of the building, or to a position accessible to the external air, and the filter or purifier is arranged on the end of said pipe for preventing the entrance of dust or vermin to said pipe as the air passes into it. Said air-filter is constructed as follows: A spider or open frame, Q, having suitable connecting devices or screw-sockets, is attached to the end of the pipe H. This spider-frame supports a sheet-metal case or cylinder, $p'$, provided with a conical or other shaped cap, $p^2$, fitting to and closing its top end. The bottom end of said cylinder, which is open for admitting air, is protected by a fine wire-netting, Q', to prevent insects from building nests in the lower part of the casing, and thus blocking up the entrance-passage. A tube, $H^2$, extends up within the interior to near the top of the casing. This may be an extension of pipe H. The space between the tube $H^2$ and cylindrical shell is filled with loosely-packed cotton, T, or other fibrous material, and a series of woven-wire disks or partitions, $t$, are preferably inserted at intervals to keep the fibrous filling in position. The air to enter the pipe H passes in through the gauze Q' and up through the packing-cotton to the top space of the casing, and thence down through the center tube, $H^2$, and into the pipe H and tank-chamber A, the air being thus purified from dust and vermin before it enters the tank.

When the apparatus is employed, as designed, in connection with a close water-service tank, the lower part of the air-filter is provided with an automatic guard-valve mechanism, $v$ $v'$, to prevent the forcing of water up into the fibrous packing in case the stop-valve I should from any cause fail to stop the passage. A lever, V, is fulcrumed within a chamber, U, or enlargement between the pipes H and $H^2$. At one end of said lever is a valve, $v'$, that closes the passage to the pipe $H^2$, and at its other end is suspended a valve, $v^2$, that closes a passage leading downward to the exterior of the casing. When one of said valves is open, the other is closed, and vice versa. Suspended from the valve-lever V, within the pipe H, is a counterbalancing-body, $V^4$ formed of wood or a substance that has specific gravity greater than air and less than water. Said body $V^4$ is sufficiently small in diameter to give ample passage for air between it and the inner surface of the pipe H. When only air is in the pipe H, the weight of the body $V^4$ draws down the lever V and retains the valve $v^2$ closed and valve $v'$ open, as indicated in Fig. 2. This is the normal position, and the one maintained so long as the air-valve I operates properly; but should said valve I fail to perfectly close the passage and water be forced up the pipe H the body $V^4$ would float upward with the advance of the water and work the lever V, thus causing the valve $v'$ to be closed to exclude the water from the tube $H^2$, and the valve $v^2$ to be opened, so that the water should escape to the exterior, thereby indicating that the valve I was not in perfect order.

What I claim as of my invention, and desire to secure by Letters Patent, is—

1. An air-filter consisting of the open spider-frame Q, the close-capped cylinder open at the bottom and supported on said spider-frame, the air-exit pipe $H'$ H, leading downward from the upper interior part of said cylinder, the wire-gauze disks $t$ and fibrous filling T within the cylinder, and the wire-gauze or perforated guard $Q'$ at the bottom of said cylinder, said parts being constructed and combined substantially as and for the purposes set forth.

2. An air-filtering apparatus for storage-tanks provided with an automatic cut-off valve and side issue-passage between the filtering substance and delivery-pipe, to prevent reverse flow through said filter, substantially as set forth.

3. The combination, with the air-pipe H, cylinder $P'$, and air-filtering material T, of the valves $v'$ $v^2$, lever V, and float-body $V^4$, substantially as and for the purpose set forth.

Witness my hand this 4th day of January, A. D. 1886.

JOHN HOWES.

Witnesses:
 CHAS. H. BURLEIGH,
 A. P. HOWES.